United States Patent
He

(10) Patent No.: US 11,339,081 B2
(45) Date of Patent: May 24, 2022

(54) ANTIMICROBIAL STRENGTHENED GLASS AND PREPARATION PROCESS THEREOF

(71) Applicant: DongGuan JEX Industrial Co., Ltd, DongGuan (CN)

(72) Inventor: Wei He, ShenZhen (CN)

(73) Assignee: DONGGUAN JEX INDUSTRIAL CO., LTD, Dongguan (CN)

( * ) Notice: Subject to any disclaimer, the term of this patent is extended or adjusted under 35 U.S.C. 154(b) by 342 days.

(21) Appl. No.: 16/574,111

(22) Filed: Sep. 18, 2019

(65) Prior Publication Data
US 2020/0010357 A1 Jan. 9, 2020

(51) Int. Cl.
| | |
|---|---|
| C03B 27/00 | (2006.01) |
| C03C 21/00 | (2006.01) |
| C03C 3/093 | (2006.01) |
| C03C 17/34 | (2006.01) |
| C03C 4/00 | (2006.01) |
| C03C 19/00 | (2006.01) |
| C03C 17/32 | (2006.01) |
| C03C 23/00 | (2006.01) |
| C03C 27/10 | (2006.01) |

(52) U.S. Cl.
CPC ............ *C03C 3/093* (2013.01); *C03C 4/00* (2013.01); *C03C 17/3405* (2013.01); *C03C 19/00* (2013.01); *C03C 21/002* (2013.01); *C03C 17/32* (2013.01); *C03C 23/007* (2013.01); *C03C 27/10* (2013.01); *C03C 2204/02* (2013.01)

(58) Field of Classification Search
None
See application file for complete search history.

(56) References Cited

U.S. PATENT DOCUMENTS

| | | | |
|---|---|---|---|
| 9,758,428 B1 * | 9/2017 | Zhang | C03C 21/005 |
| 2014/0370302 A1 * | 12/2014 | Amin | C03C 4/18 |
| | | | 65/30.13 |
| 2014/0370303 A1 * | 12/2014 | Jin | C03C 21/002 |
| | | | 65/30.14 |
| 2015/0225288 A1 * | 8/2015 | Bookbinder | C03C 21/005 |
| | | | 65/30.14 |

(Continued)

FOREIGN PATENT DOCUMENTS

| | | |
|---|---|---|
| CN | 103068764 B | 1/2016 |
| CN | 108779024 A | 11/2018 |

*Primary Examiner* — Cynthia Szewczyk
(74) *Attorney, Agent, or Firm* — Bayramoglu Law Offices LLC

(57) ABSTRACT

An antimicrobial strengthened glass and a preparation process thereof. The antimicrobial strengthened glass made from components including 30-50 parts of silicon dioxide, 10-20 parts of epoxy resin, 10-20 parts of titanium dioxide, 5-15 parts of nano bismuth oxide, 8-12 parts of boron oxide, 4-8 parts of chlorinated polyethylene, 2-6 parts of aluminum oxide, 1-3 parts of sodium oxide, 1-3 parts of manganese dioxide, 5-15 parts of graphite powder, 1-3 parts of barium sulfate, 2-4 parts of calcium hexaluminate, 1-3 parts of sodium fluorosilicate, 2-4 parts of borax decahydrate, 3-5 parts of sodium oxalate, 1-2 parts of sodium phosphate, 1-3 parts of sodium carbonate, 1-3 parts of potassium persulfate, 1-2 parts of potassium carbonate, 1-5 parts of ethylenediamine tetraacetic acid disodium, 1-5 parts of acrylamide, 0.01-1 part of silver nitrate and 0.01-1 parts of zinc sulfate.

9 Claims, 1 Drawing Sheet

(56) References Cited

U.S. PATENT DOCUMENTS

| | | | |
|---|---|---|---|
| 2015/0230476 A1* | 8/2015 | Bookbinder | C03C 12/00 |
| | | | 424/602 |
| 2017/0036954 A1* | 2/2017 | Kuksenkova | C03C 21/002 |
| 2017/0204005 A1* | 7/2017 | Hu | A01N 25/08 |
| 2018/0141854 A1* | 5/2018 | Huang | C03C 21/005 |

* cited by examiner

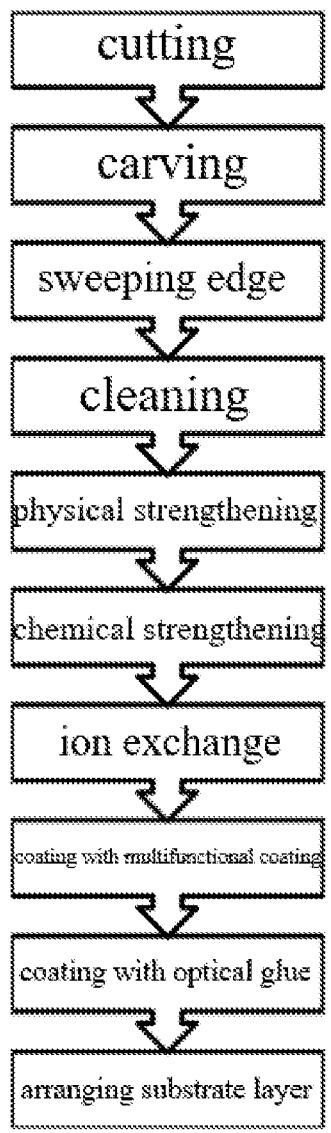

ANTIMICROBIAL STRENGTHENED GLASS AND PREPARATION PROCESS THEREOF

TECHNICAL FIELD

The present invention relates to a chemically strengthened glass, particularly to an antimicrobial strengthened glass and a preparation process thereof.

BACKGROUND

Environmental damage and disease have become an increasing concern as a result of rapid growth in industry. In recent years, the threat of SARS, Ebola and avian influenza virus have raised people's awareness of cleanliness and hygiene. With the advancement of touch technology, consumers have come to realize that there may be bacteria on mobile devices, especially when they are used at home and at work, because the mobile devices' touch-enabled surfaces are increasingly being shared. Therefore, there is an urgent need to develop an effective and low-cost glass cover having antibacterial properties.

Silver has long been known to have superior antibacterial properties. However, silver is relatively expensive and therefore cannot be fully used in industrial glass production. Most conventional antibacterial glass has a silver antibacterial layer on the glass surface. There are several methods that can be used to form this layer. Some examples are adding silver to the glass-forming raw material, spray pyrolysis of silver salt, adding silver to an ion exchange bath, coating glass with silver, vacuum sputtering with silver, and a sol-gel process for forming a silver-doped silica composite transparent film from a solution containing silver nitrate and ethyl orthosilicate. Among these methods, adding silver to an ion exchange bath is the most common and is the most likely technique for mass producing glass having antibacterial properties. Conventional ion exchange processes are used to chemically strengthen glass substrates and generally involve placing glass in a molten salt which contains ions having a larger ionic radius than the ions in the glass such that the smaller ions present in the glass can be replaced by the larger ions in the molten salt solution. In general, potassium ions present in the molten salt will substitute the smaller sodium ions present in the glass, resulting in formations of compressive stress layers on both surfaces of the glass as well as a central tension zone sandwiched between the compressive stress layers. The compact tension ("CT") (generally expressed in "megapascals (MPa)") in the central tension zone is related to the compressive stress ("CS") (generally expressed in "megapascals") of the compressive stress layer and the depth of the compressive stress layer ("DOL"), as shown in the following equation:

$$CT = CS \times DOL/(t - 2DOL), \text{ where } t \text{ is the thickness of the glass.}$$

Conventional ion exchange methods for making glass having antibacterial properties include a single-step process for adding silver to a conventional ion exchange bath. However, glass produced by the single-step ion exchange method has certain disadvantages such as silver gelation which reduces the transmittance of visible light, low antibacterial effect due to low silver concentration on the glass surface, and a significant amount of silver present in the deep ion exchange layer of the glass which has no effect on the antibacterial properties of the glass.

Glass, which is capable of ion exchange and made from batch materials that simply contains silver, also has disadvantages. Glass produced from such batch materials will has a low silver concentration on the glass surface and thus will have undesirable antibacterial properties. If an attempt is made to overcome this problem by including a high concentration of silver in the batch material, the resulting glass will have a visible yellow color and reduced antibacterial properties due to the gelation of silver caused by the high temperature ion exchange process, which will result in a decrease of glass transmittance.

The document of CN103068764B discloses a coated antimicrobial chemically strengthened glass and a preparation process thereof in which a significantly high concentration of silver ions on the glass surface are achieved by a two-step method. However, in order to improve the antimicrobial effect, it is often necessary to increase the concentration of silver ions, which may result in an undesired yellow color.

The document of CN108779024A discloses an antibacterial chemically strengthened glass and a method for producing the chemically strengthened antibacterial glass. The antibacterial chemically strengthened glass includes an antibacterial surface layer having at least 0.1 at % (where at % is an atomic percentage) of silver ions and at least 0.1 at % of copper ions, wherein the chemically strengthened antibacterial glass has a CIE color channel b* of less than 1 and the glass is produced by a three-step ion exchange method. This method has low production efficiency, high production cost, and weak market competitiveness.

The chemically strengthened antibacterial glass obtained by the two-step ion exchange method or the three-step ion exchange method only has a significantly high silver ion concentration on the glass surface. The silver ions on the glass surface are easily lost and in order to reduce the influence of the loss of the silver ions on the antibacterial effect, it is necessary to increase the doping amount of silver ions, thereby affecting the transmittance of the glass. In order to solve these problems, the present invention provides an antimicrobial strengthened glass and a preparation method thereof.

SUMMARY

In several exemplary embodiments, the present invention provides a chemically strengthened glass having antibacterial properties and a method for making the chemically strengthened glass. The chemically strengthened glass has some special applications such as an antibacterial glass covering for electronic displays and touch displays (such as smart phones, tablets, notepads, and automated teller machines), vehicle windshields and building structures. The chemically strengthened glass can also be used in handheld articles that would benefit from having antibacterial properties, such as baby bottles and glassware. As used herein, the term antibacterial or antimicrobial refers to a material having one or more of antibiotic, antibacterial, antifungal, antiparasitic and antiviral properties.

According to the several exemplary embodiments, an antimicrobial strengthened glass is made from the following components capable of ion exchange by weight:

30-50 parts of silicon dioxide, 10-20 parts of epoxy resin, 10-20 parts of titanium dioxide, 5-15 parts of nano bismuth oxide, 8-12 parts of boron oxide, 4-8 parts of chlorinated polyethylene, 2-6 parts of aluminum oxide, 1-3 parts of sodium oxide, 1-3 parts of manganese dioxide, 5-15 parts of graphite powder, 1-3 parts of barium sulfate, 2-4 parts of calcium hexaluminate, 1-3 parts of sodium fluorosilicate, 2-4 parts of borax decahydrate, 3-5 parts of sodium oxalate, 1-2 parts of sodium phosphate, 1-3 parts of sodium carbonate, 1-3 parts of potassium persulfate, 1-2 parts of potassium carbonate, 1-5 parts of ethylenediamine tetraacetic acid disodium, 1-5 parts of acrylamide, 0.01-1 part of silver nitrate and 0.01-1 parts of zinc sulfate.

In the present invention, a small amount of silver ions is directly added to the components of the strengthened glass in order to avoid reducing the antibacterial effect after the loss of the silver ions exchanged on the surface and to avoid the strengthened glass from becoming yellow and thus affecting the transmittance of visible light due to the increase of the concentration of the silver ions for enhancing the antibacterial effect.

In order to overcome the disadvantages and deficiencies existing in the prior art, another objective of the present invention is to provide a process for preparing an antimicrobial strengthened glass. The preparation process can effectively prevent fragile edges and cracks in the product by using high temperature physical and chemical double strengthening. The surface strength, as compared with existing products, is enhanced by more than 50%. The preparation process includes simple steps, is convenient in operation and control, achieves stable quality, has high production efficiency, has low production cost and is suitable for large-scale industrial production.

The strengthened glass of the invention results in having the properties of good wear resistance, good shatterproof effects, prevents fingerprint residue, and prevents scratching of the display screen. The strengthened glass has relatively strong edge adhesion ability and avoids edge warping. Moreover, the strengthened glass has the advantages of high transmittance, high touch sensitivity, high hardness, good scratch resistance and strong impact resistance.

The objective of the present invention is achieved through the below process of making an antimicrobial strengthened glass. The process includes the following steps:

(1) Cutting: cutting a glass substrate, where the glass substrate was prepared by components capable of ion exchange, into a desired shape and size by using a cutting machine;

(2) CNC carving: using a computer numerical control (CNC) machine to engrave a hole position of the corresponding model on the glass substrate after cutting;

(3) Sweeping edge: polishing an edge of the glass substrate to make the edge have a certain arc;

(4) Ultrasonic cleaning: in a clean room, placing the glass substrate in an ultrasonic cleaner for cleaning;

(5) Physical strengthening: placing the glass substrate in a tempering furnace for physical strengthening, wherein a temperature of the tempering furnace is controlled at a first strengthening temperature of 600° C.-700° C. and a time of the physical strengthening is a first time (T1) of 5-60 minutes;

(6) Chemical strengthening: heating potassium nitrate to a second strengthening temperature of 380° C.-440° C. and chemically strengthening the physically strengthened glass substrate to obtain a strengthened glass body, wherein a time of the chemical strengthening is a second time (T2) of 5-30 minutes;

(7) Ion exchange: heating silver nitrate to a third ion exchange temperature of 350° C.-420° C. and performing the ion exchange on the chemically strengthened glass substrate to obtain an antimicrobial strengthened glass body, wherein a time of the ion exchange is a third time (T3) of 1-30 min;

(8) Coating a layer of multifunctional coating on an upper surface of the strengthened glass body to obtain a multifunctional coating layer;

(9) Coating a layer of optical adhesive on a lower surface of the strengthened glass body to obtain an optical adhesive layer;

(10) arranging a substrate layer on a lower surface of the optical adhesive layer to obtain the strengthened glass.

The preparation process of the present invention can effectively prevent fragile edges and cracks in the product by using high temperature physical and chemical double strengthening. The surface strength, as compared to existing products, is enhanced by more than 50%. The preparation process includes simple steps, is convenient in operation and control, achieves stable quality, has high production efficiency, has low production cost and is suitable for large-scale industrial production.

The glass substrate of the present invention adopts the above raw materials and strictly controls the weight ratio of the various raw materials. The obtained strengthened glass has lower density and has a stable performance while avoiding the problem of increasing weight because the screen is too large. Also, the strengthened glass ensures a smooth and scratch-free surface of the screen glass and enables a mobile phone to be lightweight. The mechanical strength and hardness of the screen glass are improved allowing for full-fit screen glass which has high production efficiency and stable product quality.

Preferably, in the step (8), the multifunctional coating is prepared by mixing the following raw materials by weight: 20-40 parts of nano glass resin, 15-35 parts of waterborne acrylic acid styrene-acrylic emulsion, 15-25 parts of high gloss resin, 4-8 parts of polymethylsilsesquioxane, 3-7 parts of nano silicon dioxide, 2-6 parts of nano barium sulfate, 1-5 parts of laser ink, 1-3 parts of wax emulsion, 1-3 parts of film-forming auxiliary, 0.3-0.7 part of pH adjuster, 0.3-0.7 part of defoamer, 0.5-0.9 part of leveling agent, 0.4-0.8 part of dispersant, 0.6-1.0 part of wetting agent, 0.1-0.5 part of thickener, and 10-20 parts of deionized water.

The multifunctional coating of the present invention adopts a waterborne acrylic acid styrene-acrylic emulsion dispersion system, along with an environmentally-friendly film-forming auxiliary, which can effectively reduce the (volatile organic compounds) VOC content, produces less odor, is more environmentally friendly than existing coatings, and prevents environmental pollution. Using a nano glass resin as a film-forming material can enhance the hardness of the coating. When nano silicon dioxide and nano barium sulphate as fillers are used along with the nano glass resin, not only the hardness of the coating is improved, but also the toughness of the coating is increased compared with similar products. The nano glass resin has great improvements in hardness, adhesion, pollution and weather resistance, and also has excellent water and alkali resistance as well as excellent stain resistance. Using a high gloss resin can greatly improve the hardness and gloss of the coating. Polymethylsilsesquioxane is used to achieve good water and stain resistance, self-cleaning and scrub resistance, which can easily wipe off all kinds of graffiti or life stains such as dust-free chalk, dust and tea and oil stains having good durability for wiping off repeated pollution, good lubricity, and can promote pigment dispersion and prevent aggregation of pigment and powder. The use of high temperature resistant blue light absorber enables the coating to absorb blue light, thereby reducing the damage of the blue light emitted by the screen to the eyes. The use of nano zinc oxide achieves long-lasting, mild sterilization of the coating. The use of laser ink gives the coating a colorful character. The use of a defoamer, a leveling agent, a dispersant, a wetting agent and a thickener can significantly improve the film-forming property, improve the gloss, strength, powdering resistance and leveling of the coating film and has excellent wet film properties, improved weather resistance and enhanced color development.

Preferably, the film-forming auxiliary is a mixture of texanol, diethylene glycol butyl ether and 2,2,4-trimethy-1,3-pentanediol monoisobutyrate in a weight ratio of 1:0.8-1.2:1.5-2.5. The present invention strictly controls the type, compounding and ratio of the film-forming auxiliary and the three film-forming auxiliaries are all environmental friendly auxiliaries, which can effectively reduce the minimum film-forming temperature of the multifunctional coating, improve the scrub resistance of the multifunctional coating and the quality of the coating film. The present invention significantly improves the film-forming performance, increases the gloss, strength and powdering resistance of the coating film and enhances the leveling property. The present invention also has excellent wet film properties, improved weather resistance and enhanced color development.

The pH adjuster is at least one of organic amine, sodium hydroxide, sodium hydrogencarbonate, ammonium hydrogencarbonate, and aqueous ammonia. The present invention can adjust the pH value of the reaction system by using the above pH adjusting agent.

Preferably, the defoamer is a mixture of polyoxypropylene glyceryl ether, sodium carboxymethylcellulose and silicon-containing polyether in a weight ratio of 1.5-2.5:0.8-1.2:1. The present invention has the characteristics of high defoaming speed, long antifoaming time, good effect, good diffusion, good permeability and good thermal stability by strictly controlling the type, compounding and ratio of the defoamer.

The leveling agent is a mixture of polydimethylsiloxane, polyether polyester modified organosiloxane, and alkyl modified organosiloxane in a weight ratio of 1:0.8-1.2:1.4-2.2. By strictly controlling the type, compounding and ratio of the leveling agent, the present invention can effectively reduce the surface tension of the coating, improve the leveling and uniformity thereof, improve the permeability of the coating, reduce the occurrence of spots and traces during brushing, and increase the coverage to make the formed film uniform and natural, so that the coating forms a flat, smooth and uniform coating film during the drying and film formation process.

Preferably, the wetting agent is a mixture of polyoxyethylene alkyl phenol ether, polyoxyethylene fatty alcohol ether and polyoxyethylene-polyoxypropylene block copolymer in a weight ratio of 1-2:0.5-1.5:1. The present invention, through strictly controlling the type, compounding and ratio of the wetting agent, has good wetting effect, which is beneficial to the wetting of the nano silicon dioxide and the nano barium sulfate filler.

The dispersant is a mixture of sodium lauryl sulfate, sodium poly[(naphthaleneformaldehyde)sulfonate] and dialkyl sodium sulfosuccinate in a weight ratio of 2-4:0.5-1.5:1. The present invention, through strictly controlling the type, compounding and ratio of the dispersant, has good dispersing effect, which is favorable for the dispersing of the nano silicon dioxide and the nano barium sulfate filler.

The thickener is a mixture of methylcellulose, hydroxyethyl cellulose and hydroxypropyl methyl cellulose in a weight ratio of 1-2:0.5-1.5:1. The present invention, through strictly controlling the type, compounding and ratio of the thickener, has good thickening effect, which can enhance the stability of the coating.

Preferably, in the step (9), the optical adhesive is made of the following raw materials by weight: 20-40 parts of urethane acrylate, 5-15 parts of hydroxy acrylic resin, 5-15 parts of epoxy acrylate, 10-20 parts of acrylate monomer, 2-6 parts of photoinitiator, 1-2 parts of defoamer, 1-2 parts of leveling agent and 40-60 parts of mixed solvent.

The optical adhesive of the present invention has excellent adhesive properties and toughness and good self-leveling effect, so that the tempered film fits perfectly with the screen of the mobile phone and the position of the tempered film can be adjusted during the attachment process to avoid the occurrence of bubbles and white edges, ensuring the accuracy of the film attaching. The components contain acrylate monomer, so the optical adhesive has high transmittance and a high refractive index to ensure clear screen quality. The tempered film using the optical adhesive can be torn and the optical adhesive will not be left on the screen of the mobile phone after tearing the film, which will not affect the use of the screen of the mobile phone. Moreover, using the optical adhesive produced by the present invention can achieve an excellent explosion-proof performance and strong impact resistance because of its own adhesiveness and high-strength flexibility of the adhesive layer, thereby better protecting the screen of the mobile phone. The drying temperature is 110° C.-130° C., the curing time is 5-15 minutes, and the thickness is preferably 10-50 μm.

Preferably, the acrylate monomer is composed of the following raw materials by weight: 10-20 parts of methyl methacrylate, 5-15 parts of acrylonitrile, 15-25 parts of lauryl acrylate, 8-12 parts of acrylate-2-ethylhexyl, 4-8 parts of glycidyl methacrylate, 2-6 parts of N-methylol acrylamide. The present invention strictly controls the type, compounding and ratio of the acrylate monomer and the obtained optical adhesive has the features of fast drying, good adhesion, good heat and weather resistance and good outdoor durability.

The photoinitiator is a mixture of cumene hydroperoxide, ammonium persulfate and azobisisobutyronitrile in a weight ratio of 0.5-1.5:0.8-1.2:1. By strictly controlling the type, compounding and ratio of the photoinitiator, the present invention can initiate the polymerization reaction at a relative low temperature, which can improve the reaction rate and reduce energy consumption.

Preferably, the defoamer is a mixture of polyoxypropylene glyceryl ether, sodium carboxymethylcellulose and silicon-containing polyether in a weight ratio of 1.5-2.5:0.8-1.2:1. The present invention has the characteristics of high defoaming speed, long antifoaming time, good effect, good diffusion, good permeability and good thermal stability by strictly controlling the type, compounding and ratio of the defoamer.

The leveling agent is a mixture of polydimethylsiloxane, polyether polyester modified organosiloxane, and alkyl modified organosiloxane in a weight ratio of 1:0.8-1.2:1.4-2.2. By strictly controlling the type, compounding and ratio of the leveling agent, the present invention can effectively reduce the surface tension of the optical adhesive, improve the leveling and uniformity thereof, improve the permeability of the optical adhesive, reduce the occurrence of spots and traces during brushing and increase the coverage to make the formed film uniform and natural, so the optical adhesive forms a flat, smooth and uniform coating film during the drying and film formation process.

The mixed solvent is a mixture of propylene glycol methyl ether, ethyl acetate and butanone in a volume ratio of 1:1-2:0.8-1.2. The present invention strictly controls the type, compounding and ratio of the mixed solvent and has good dissolution effect and high curing speed.

The present invention has the following advantages. The preparation process of the present invention can effectively prevent fragile edges and cracks in the product by using high temperature physical and chemical double strengthening. The surface strength, as compared to existing products, is enhanced by more than 50%. The preparation process has simple steps, is convenient in operation and control, achieves stable quality, has high production efficiency, has low production cost and is suitable for large-scale industrial production.

The strengthened glass of the invention results in having the properties of being antibacterial, wear resistance and shatterproof. The strengthened glass also prevents fingerprint residue and prevents scratching of the display screen. The strengthened glass has strong edge adhesion ability and avoids edge warping. Further, the strengthened glass has high transmittance, high touch sensitivity, high hardness, good scratch resistance and strong impact resistance.

BRIEF DESCRIPTION OF THE DRAWINGS

FIGURE shows a flow chart of a preparation process of an antimicrobial strengthened glass.

DETAILED DESCRIPTION OF THE EMBODIMENTS

The present invention will be further described hereinafter with reference to the accompanying drawing and embodiments.

Embodiment I

An antimicrobial strengthened glass is made from the following components capable of ion exchange by weight:

30-50 parts of silicon dioxide, 10-20 parts of epoxy resin, 10-20 parts of titanium dioxide, 5-15 parts of nano bismuth oxide, 8-12 parts of boron oxide, 4-8 parts of chlorinated polyethylene, 2-6 parts of aluminium oxide, 1-3 parts of sodium oxide, 1-3 parts of manganese dioxide, 5-15 parts of graphite powder, 1-3 parts of barium sulfate, 2-4 parts of calcium hexaaluminate, 1-3 parts of sodium fluorosilicate, 2-4 parts of borax decahydrate, 3-5 parts of sodium oxalate, 1-2 parts of sodium phosphate, 1-3 parts of sodium carbonate, 1-3 parts of potassium persulfate, 1-2 parts of potassium carbonate, 1-5 parts of ethylenediamine tetraacetic acid disodium, 1-5 parts of acrylamide, 0.01-1 part of silver nitrate and 0.01-1 parts of zinc sulfate.

A process for preparing an antimicrobial strengthened glass including the steps of:

(1) Cutting: cutting a glass substrate, where the glass substrate was prepared by components capable of ion exchange, into a desired shape and size by using a cutting machine;

(2) CNC carving: using a computer numerical control (CNC) machine to engrave a hole position of the corresponding model on the glass substrate after cutting;

(3) Sweeping edge: polishing an edge of the glass substrate to make the edge have a certain arc;

(4) Ultrasonic cleaning: in a clean room, placing the glass substrate in an ultrasonic cleaner for cleaning;

(5) Physical strengthening: placing the glass substrate in a tempering furnace for physical strengthening, wherein a temperature of the tempering furnace is controlled at a first strengthening temperature of 600° C.-700° C. and a time of the physical strengthening is a first time (T1) of 5-60 minutes;

(6) Chemical strengthening: heating potassium nitrate to a second strengthening temperature of 380° C.-440° C. and chemically strengthening the physically strengthened glass substrate to obtain a strengthened glass body, wherein a time of the chemical strengthening is a second time (T2) of 5-30 minutes;

(7) Ion exchange: heating silver nitrate to a third ion exchange temperature of 350° C.-420° C. and performing the ion exchange on the chemically strengthened glass substrate to obtain an antimicrobial strengthened glass body, wherein a time of the ion exchange is a third time (T3) of 1-30 minutes;

(8) coating a layer of multifunctional coating on an upper surface of the strengthened glass body to obtain a multifunctional coating layer;

(9) coating a layer of optical adhesive on a lower surface of the strengthened glass body to obtain an optical adhesive layer;

(10) arranging a substrate layer on a lower surface of the optical adhesive layer to obtain a strengthened glass.

Further, the strengthened glass body is removed from the chemical strengthening ion exchange bath after subjected to the chemical strengthening ion exchange bath in step (6). The strengthened glass body is transferred to the ion exchange bath for ion exchange. According to several exemplary embodiments, the ion exchange bath includes silver compound, such as a molten silver salt. According to several exemplary embodiments, the molten silver salt includes silver nitrate.

In the ion exchange of step (7), the ion exchange bath further includes molten potassium nitrate having a substantially greater weight percentage than the silver salt. According to several exemplary embodiments, the ion exchange bath includes 99.0-99.99 wt % of potassium nitrate and 0.01-1.0 wt % of silver salt.

During the operation, the strengthened glass body is placed in the ion exchange bath for a third time (T3) at a third ion exchange temperature (Temp3). The third time (T3) is substantially shorter than the first time (T1). According to several exemplary embodiments, the third time (T3) is less than 30 minutes. According to several exemplary embodiments, the third time (T3) is between 1 minute and 30 minutes, between 1 minute and 20 minutes, or between 1 minute and 10 minutes. The third ion exchange temperature (Temp3) is selected in consideration of the inclusion of silver for the antibacterial effect and the optical properties of the glass. According to several exemplary embodiments, the third ion exchange temperature (Temp3) is lower than the first strengthening temperature (Temp1) and the second strengthening temperature (Temp2). According to several exemplary embodiments, the third ion exchange temperature (Temp3) is between 350° C. and 420° C. According to several exemplary embodiments, each of the first, second and third temperatures is adjusted from 350° C. to 700° C.

As described above, the formed glass has an antibacterial effect, a strengthened surface, and optimized optical properties. According to several exemplary embodiments, the compression layer has a compressive stress greater than 700 MPa and a thickness t1 greater than 5 μm.

The above description is only the preferred embodiment(s) of the present invention, which is a further detailed description of the present invention in conjunction with the specific preferred embodiments. It should not be considered that the specific embodiments of the invention are limited to the description. Any modifications, equivalent substitutions and improvements made within the spirit and scope of the present invention are intended to be included within the protective scope of the present invention.

What is claimed is:

1. A process for preparing an antimicrobial strengthened glass, comprising the steps of:
    (1) cutting: cutting a glass substrate prepared from components comprising 30-50 parts of silicon dioxide, 10-20 parts of epoxy resin, 10-20 parts of titanium dioxide, 5-15 parts of nano bismuth oxide, 8-12 parts of boron oxide, 4-8 parts of chlorinated polyethylene, 2-6 parts of aluminum oxide, 1-3 parts of sodium oxide, 1-3 parts of manganese dioxide, 5-15 parts of graphite powder, 1-3 parts of barium sulfate, 2-4 parts of calcium hexaluminate, 1-3 parts of sodium fluorosilicate, 2-4 parts of borax decahydrate, 3-5 parts of sodium oxalate, 1-2 parts of sodium phosphate, 1-3 parts of sodium carbonate, 1-3 parts of potassium persulfate, 1-2 parts of potassium carbonate, 1-5 parts of ethylenediamine tetraacetic acid disodium, 1-5 parts of acrylamide, 0.01-1 part of silver nitrate and 0.01-1 parts of zinc sulfate into a desired shape and size by using a cutting machine;
    (2) CNC carving: using a computer numerical control (CNC) machine to engrave a hole position of a corresponding model on the glass substrate after the cutting;
    (3) sweeping edge: polishing an edge of the glass substrate to make the edge have an arc;
    (4) ultrasonic cleaning: in a clean room, placing the glass substrate in an ultrasonic cleaner for cleaning;
    (5) physical strengthening: placing the glass substrate in a tempering furnace for physical strengthening, wherein a temperature of the tempering furnace is controlled at a first strengthening temperature of 600° C.-700° C. and a time of the physical strengthening is 5-60 minutes;
    (6) chemical strengthening: heating potassium nitrate to a second strengthening temperature of 380° C.-440° C. and chemically strengthening the physically strengthened glass substrate to obtain a strengthened glass body, wherein a time of the chemical strengthening is 5-30 minutes;
    (7) ion exchange: heating silver nitrate to a third ion exchange temperature of 350° C.-420° C. and performing the ion exchange on the chemically strengthened glass substrate to obtain an antimicrobial strengthened glass body, wherein a time of the ion exchange is 1-30 minutes;
    (8) coating a layer of multifunctional coating on an upper surface of the strengthened glass body to obtain a multifunctional coating layer;
    (9) coating a layer of optical adhesive on a lower surface of the strengthened glass body to obtain an optical adhesive layer;
    (10) arranging a substrate layer on a lower surface of the optical adhesive layer to obtain a strengthened glass.

2. The process for preparing the antimicrobial strengthened glass according to claim 1, wherein in the step (8), the multifunctional coating is prepared by mixing the following raw materials by weight: 20-40 parts of nano glass resin, 15-35 parts of waterborne acrylic acid styrene-acrylic emulsion, 15-25 parts of high gloss resin, 4-8 parts of polymethylsilsesquioxane, 3-7 parts of nano silicon dioxide, 2-6 parts of nano barium sulfate, 1-5 parts of laser ink, 1-3 parts of wax emulsion, 1-3 parts of film-forming auxiliary, 0.3-0.7 part of pH adjuster, 0.3-0.7 part of defoamer, 0.5-0.9 part of leveling agent, 0.4-0.8 part of dispersant, 0.6-1.0 part of wetting agent, 0.1-0.5 part of thickener and 10-20 parts of deionized water.

3. The process for preparing the antimicrobial strengthened glass according to claim 2, wherein the film-forming auxiliary is a mixture of texanol, diethylene glycol butyl ether and 2,2,4-trimethy-1,3-pentanediol monoisobutyrate in a weight ratio of 1:0.8-1.2:1.5-2.5.

4. The process for preparing the antimicrobial strengthened glass according to claim 2, wherein the pH adjuster is at least one selected from the group consisting of organic amine, sodium hydroxide, sodium hydrogencarbonate, ammonium hydrogencarbonate, and aqueous ammonia; a pH value of a reaction system is adjusted by using the pH adjuster.

5. The process for preparing the antimicrobial strengthened glass according to claim 2, wherein the defoamer is a mixture of polyoxypropylene glyceryl ether, sodium carboxymethylcellulose and silicon-containing polyether in a weight ratio of 1.5-2.5:0.8-1.2:1.

6. The process for preparing the antimicrobial strengthened glass according to claim 2, wherein the leveling agent is a mixture of polydimethylsiloxane, polyether polyester modified organosiloxane and alkyl modified organosiloxane in a weight ratio of 1:0.8-1.2:1.4-2.2.

7. The process for preparing the antimicrobial strengthened glass according to claim 2, wherein the wetting agent is a mixture of polyoxyethylene alkyl phenol ether, polyoxyethylene fatty alcohol ether and polyoxyethylene-polyoxypropylene block copolymer in a weight ratio of 1-2:0.5-1.5:1.

8. The process for preparing the antimicrobial strengthened glass according to claim 2, wherein the dispersant is a mixture of sodium lauryl sulfate, sodium poly[(naphthaleneformaldehyde)sulfonate] and dialkyl sodium sulfosuccinate in a weight ratio of 2-4:0.5-1.5:1.

9. The process for preparing the antimicrobial strengthened glass according to claim 2, wherein the thickener is a mixture of methylcellulose, hydroxyethyl cellulose and hydroxypropyl methyl cellulose in a weight ratio of 1-2:0.5-1.5:1.

* * * * *